United States Patent
Pass

[11] 3,897,574
[45] July 29, 1975

[54] PURIFICATION OF ETHANOL EXTRACTANT IN SOY PROTEIN CONCENTRATE PROCESS

[75] Inventor: Darryl W. Pass, Fort Wayne, Ind.

[73] Assignee: Central Soya Company, Inc., Fort Wayne, Ind.

[22] Filed: Mar. 21, 1974

[21] Appl. No.: 453,640

[52] U.S. Cl. .............. 426/430; 203/39; 260/123.5; 426/486; 426/488
[51] Int. Cl. ............................................. A23j 1/14
[58] Field of Search ............ 203/99, 39, 95, 97, 43, 203/19, 18, 98; 426/430, 486, 488; 260/643 R, 125.5

[56] References Cited
UNITED STATES PATENTS

| | | |
|---|---|---|
| 2,017,067 | 10/1935 | Kraft ..................................... 203/19 |
| 2,801,211 | 7/1957 | Gulse et al. ............................ 203/95 |
| 3,043,826 | 7/1962 | Beaber et al. ......................... 426/430 |
| 3,230,156 | 1/1966 | Katzen ............................. 260/643 R |
| 3,265,594 | 8/1966 | De Jean et al. .................... 203/97 X |
| 3,365,440 | 1/1968 | Circle et al. ......................... 426/430 |
| 3,406,100 | 10/1968 | Karafian ............................... 203/99 |
| 3,445,345 | 5/1969 | Katzen et al. ......................... 203/99 |
| 3,520,868 | 7/1970 | Henderson et al. ................. 426/430 |
| 3,721,569 | 3/1973 | Steinkraus ........................... 426/430 |

*Primary Examiner*—Norman Yudkoff
*Assistant Examiner*—Curtis P. Ribando
*Attorney, Agent, or Firm*—Dawson, Tilton, Fallon & Lungmus

[57] ABSTRACT

A process for recovery of ethanol from a soy protein extraction process wherein odor and flavor contaminents are removed from a zone in a tray-type rectifying column.

4 Claims, 1 Drawing Figure

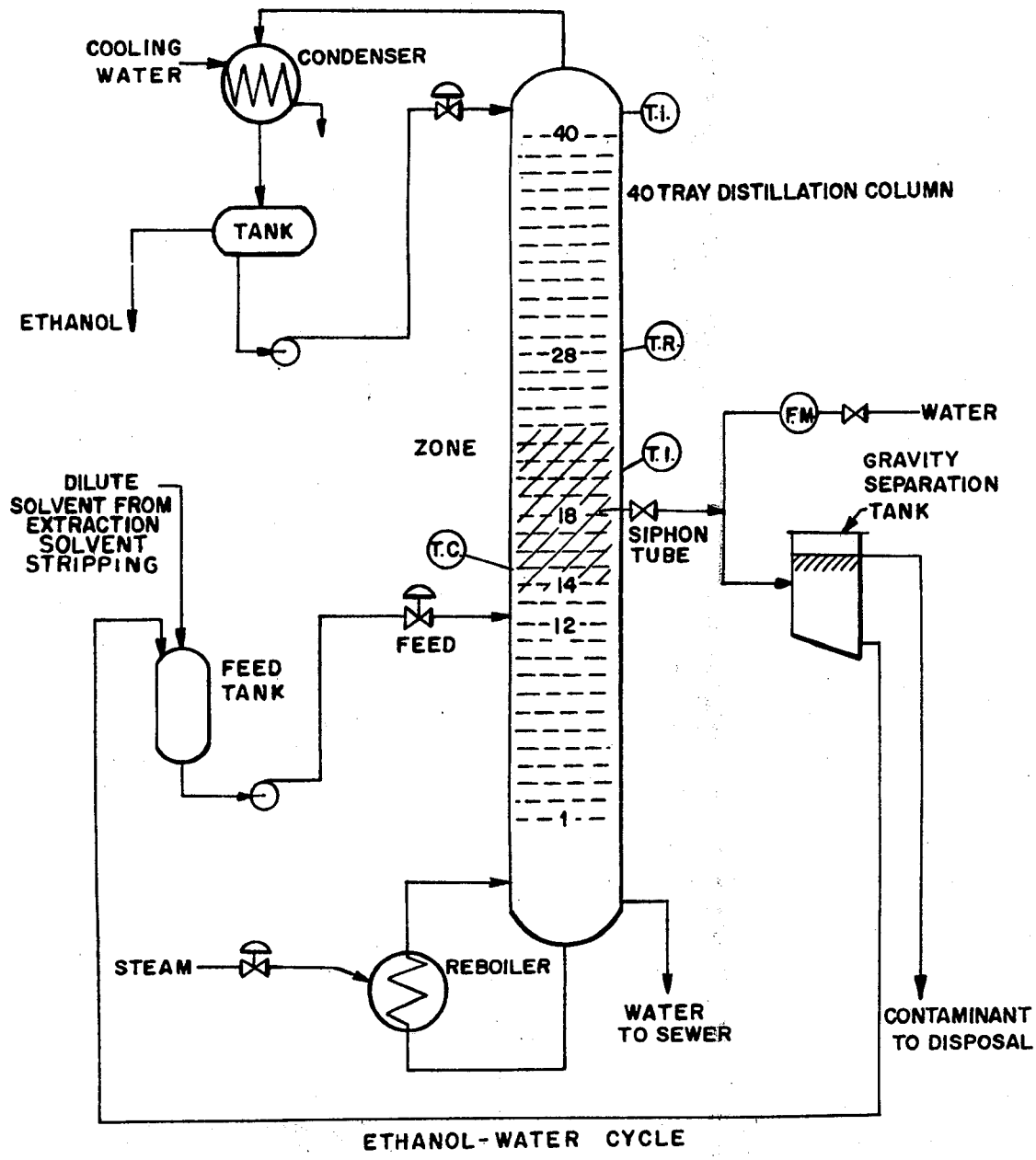

PURIFICATION OF ETHANOL EXTRACTANT IN SOY PROTEIN CONCENTRATE PROCESS

BACKGROUND OF THE INVENTION

It has been recognized that the flavor characteristics of soy protein products are major deterents to their increased utilization in foods, particularly those with relatively bland flavors. This recognition has prompted efforts to devise processing methods for improvement of the flavor of these products. Some progress has been made in this area through the concentration of the protein components of defatted soybean source material. Both soy protein isolates and soy protein concentrates have improved flavor characteristics as compared to defatted soy flours. In spite of this progress, the challenge of flavor improvement remains.

Soy protein concentrates are defined as products containing a minimum of 70% protein (N × 6.25) on a moisture-free basis. These concentrates are commercially produced by three basic processes which are well known in the art. These processes differ as to the means utilized to immobilize the major protein fraction of defatted soybean flakes or flour during extraction of the sugars, soluble nitrogeneous matter, mineral matter, and other minor constituents including objectionable flavor components. In one process, the lower molecular weight material is extracted with water acidified to about pH 4.5, the pH at which the major protein components of the soybean exhibit minimum solubility. In another process, the defatted source material is first treated with moist heat to denature or insolubilize the major protein components and then is extracted with hot water. In a third process, the defatted source material is extracted with an aqueous alcoholic solvent wherein the major protein fraction has minimum solubility.

Although aqueous solutions of methanol, ethanol, and isopropanol have been mentioned in the art as suitable for the production of soy protein concentrates, one commercially useful process, in particular, employs aqueous ethanol solvent containing about 60-80% of the alcohol. A continuous countercurrent process utilizing this solvent is described in U.S. Pat. No. 3,365,440. In this process, a defatted soybean source material, e.g. defatted soybean flakes, is passed in countercurrent fashion to a stream of about 60-80% ethanol with provision for a suitable residence time. One exiting stream contains the insoluble solids, or soy protein concentrate. The other stream, a liquid one, contains the soluble solids removed from the defatted soybean source material. It becomes apparent that some means of alcohol recovery must be provided if the process is to be commercially practical. Further, provision must be made for alcohol rectification in order to provide ethanol of suitable concentration for make-up of the process solvent.

Although it has been stated that the soy protein concentrate produced by the aqueous ethanol process has better flavor characteristics than either the concentrates produced by other process or defatted soy flours, the product is not bland and has flavor notes which limit its food utilization.

Accordingly, it is an object of this invention to provide an improved aqueous ethanol process which results in a soy protein concentrate with materially improved flavor characteristics, particularly devoid of objectionable "beany" and "grassy" notes. More specifically, it is a further object of this invention to provide a process for the recovery of ethanol which is free of objectionable flavor compounds and thus suitable for re-use in processing unextracted defatted soybean flakes.

Further objects will become apparent in the description of the invention given below.

The aqueous ethanol process for the production of soy protein concentrate from defatted soybean source materials requires several unit operations including (a) extraction or leaching, (b) desolventizing of extracted or leached insoluble solids, and (c) recovery of dissolved solids and alcohol from the extraction fluid or miscella. The extraction or leaching process, which may be carried out in various ways utilizing a variety of mechanical devices, for example as described in aforementioned U.S. Pat. No. 3,365,440, is not a part of the present invention. The removal of solvent accompanying the extracted or leached solids after removal from the extraction unit may be accomplished with a variety of desolventizing devices known to the art.

The removal or stripping of solvent (ethanol and water) from the extraction fluid or miscella containing the dissolved solids is accomplished by means known in the art. The practice of the present invention is not dependent upon the type of equipment used for this purpose.

In practice, it is customary to combine various alcohol-containing streams resulting from the removal of solvent from or desolventizing of the soy protein concentrate and from the non-proteinaceous soluble solids removed during the extraction of leaching step of the operation.

These combined streams are fed to a rectifying column designed to remove excess water from the ethanol to permit its re-use for extraction or leaching of fresh defatted soybean source material. The customary tray-type column is of conventional design and operated in a manner known in the art.

Although this rectification process results in a product that has improved flavor characteristics as compared to defatted soy flours and soy protein concentrates produced by other processes, it has been observed that flavor problems were encountered in the product from the aqueous ethanol process, and thus a need for improvement has been recognized. The obvious answer for the flavor problem heretofore was the incomplete removal of soluble non-proteinaceous matter, including objectionable flavor components, from the defatted soybean source material. Upon investigation, it was found that this was not the cause of off-flavors, and it was surprising to note some correlation between the rectifying column operation and the flavor problem. This prompted the examination of the nature and composition of the vapors and fluids in the rectifying column.

SUMMARY OF THE INVENTION

The flavor and odor contaminents can be effectively removed from the rectified ethanol by withdrawing the same from a point in a zone in the column having a temperature in the range of about 180° F. to about 200° F.

DETAILED DESCRIPTION OF THE INVENTION

The invention is described in conjunction with the accompanying drawing which schematically depicts a tray-type rectifying column along with associated piping, tanks reboiler, etc.

In the aforementioned examination, and for the purpose of illustrating the invention, a rectifying column of contentional commercial design was utilized. This column had forty trays as depicted in the drawing. The aqueous ethanol stream to be rectified was fed in on the twelfth tray and a rectified ethanol stream of about 92% ethanol concentration was obtained by condensation of overhead vapors. This recovered alcohol is then condensed and is utilized to prepare the appropriate water-ethanol mixture for extraction or leaching of defatted soybean flakes. As indicated above, the extraction fluid contains approximately about 60 to 80% alcohol. The general operation of the column was carried out in a manner well known in the art.

It was observed that if the termperature in the top tray of rectifying column exceeded approximately about 175° F., the recovered ethanol had a strong, musty, disagreeable odor and the soy protein concentration made therewith was offensive in both odor and taste, particularly when wet with water, as for use in preparation of a food. In view of the fact that the boiling point of an azeotropic mixture of ethanol-water is about 172° F. at atmospheric pressure, the range between 172° F. and 175° F. is a very restrictive one even with carefully controlled operations. Further, it was noted that with temperatures approaching 172° F. in the top tray of the column, the ethanol still retained a musty character. Upon further examination, it was discovered that in the area of the fourteenth to the twenty-second tray (certain of the trays being numbered) where the temperature is about 180° to 200° F., and in which area are located two to ten trays above the feed inlet, there was a discoloration of the aqueous ethanol mixture. A sample of the liquid was removed from the twentieth tray, and surprisingly, the sample, after cooling to about approximately 120° F., separated into two distinct liquid phases. The less dense phase was dark reddish-brown in color, somewhat oily in character, and had very persistent pungent and disagreeable odor. The denser phase proved to be water and alcohol rich. It suddenly occurred that the less dense and extremely malodorous fraction was the cause of contamination of the rectified ethanol, with the subsequent degradation in flavor of the soy protein concentrate produced with this ethanol. With continuous rectification of the ethanol-containing feed stream, the undesirable volatile fraction first concentrates in the mid-section of the column, and eventually, when the concentration reaches a critical point, it moves up and down the column, and particularly contaminates the rectified ethanol.

The continuous removal of the undesirable volatile malodorous fraction from the mid-section of the ethanol rectification column is a major step in this invention. This is accomplished by modification of the rectification column so as to provide a siphon tube at a tray in the zone (hatched) as illustrated in the drawing. This siphon tube is connected through a throttling valve to a gravity separation tank of sufficient working capacity as determined by column throughput and rate of fluid removal. In addition, the separation tank is fitted with piping at its top portion to provide for fluid disposal. Further, the separation tank is fitted with piping at the bottom portion to connect the separation tank to the rectification column feed tank. A means for introducing water (e.g., treated municipal or well water) into the separation tank or the siphon tube is provided. All piping is provided with appropriate valves and pumps, where necessary, to control flow.

In the practice of this invention, the fluid on the tray in the zone of contaminents is forced through the siphon tube by the slight positive pressure in the column and enters the separation tank. As an option, the fluid may be mixed with water before or after it enters the separation tank. This aspect of the device for practicing the invention was added when it was found that the addition of water hastened the gravity separation of the fluid into the two phases described above. The rate of fluid removed from the tray of the column is adjusted in relation to the mass transfer through the column, and, as an example, is about 0.5 gallon per minute in the particular column used to practice this invention. The rate of water addition is approximately about equal to the rate of column fluid removal. Separation of the two liquid phases takes place in the separation tank. When the separation tank has reached its working capacity, the upper or undesirable malodorous phase is taken off, continuously or periodically, at an appropriate rate through the disposal piping. The lower phase or alcohol-water rich phase is pumped to the column feed tank for subsequent rectification. The rate of addition of water in relation to the rate of fluid removal from the column is not critical in the practice of this invention. However, it is apparent that excess water is to be avoided since this places an unnecessary burden on the rectification column in the recycling process. The described process is carried out in continuous fashion.

The practical aspects of the invention were demonstrated by operating a forty tray rectifying column, as described herein by way of example, with and without removal of column fluid as described above. In each instance this was carried on for a sufficient period of time to establish the influence of fluid removal from the rectifying column on the re-use of the rectified ethanol for the production of soy protein concentrate by the hereinbefore described extraction leaching process. This influence was assessed by blind-sample evaluation of the flavor (odor and taste) of the soy protein concentrate produced during the two operational periods. This evaluation, by a trained panel of judges of flavor quality, showed conclusively that the product produced with rectified ethanol when the malodorous fluid was removed from the column was superior in flavor to the product produced with rectified alcohol when no fluid was removed from the column.

An examination of the malodorous fraction by the analytical method known as gas chromatography revealed that it was a complex mixture containing numerous major and minor components. This fraction can be further divided into acid-soluble, alkali-soluble, and neutral components by appropriate analytical methods. All fractions proved to have undesirable odor characteristics. It is speculated that these malodorous components are present in the defatted soybean source material as such, or are derived from precursors by processing. However, it should be understood that such speculation or lack of complete characterization of the bad-flavor components in no way diminishes the utility of the invention.

It should be understood that although this invention is described in terms of a particular rectifying column, the principle of this invention is not bound by the size of the column as long as it is a tray-type column wherein the fluid at individual trays may be withdrawn with a device such as described above to illustrate the invention. Further, the appropriate tray within a given column for withdrawal of the malodorous volatile fraction can be readily determined by examining the nature of fluid on the trays in mid-column section above the feed point of the column.

The following examples are illustrative of the practice of this invention.

EXAMPLE 1

In this example, spent aqueous ethanol arising from the continuous extraction or leaching of defatted soybean flakes in countercurrent fashion as described in U.S. Pat. No. 3,365,440, and stripping from dissolved solids, was rectified in a 40 tray rectifying column having a feed point at the 12th tray. The conditions of rectification were as follows:

Column feed rate: 12 gallons/minute
Feed composition: 50% ethanol
Column reflux rate: 10 gallons/minute
Reflux fluid composition: 92% ethanol
Column temperatures:
  Top tray — 172° F. (as indicated by temperature indicator TI)
  28th tray — 173° F. (as indicated by temperature recorder TR)
  20th tray — 180°–190° F. (as indicated by temperature indicator TI)
  14th tray — 190°–198° F. (as indicated by temperature controller TC)
Steam flow: 6,800 lbs./hour This column was operated without side-stream fluid removal. When the ethanol recovered in this fashion was used for the subsequent leaching of defatted soybean flakes, the resulting desolventized soy protein concentrate was of marginal flavor quality. This was ascertained in a blind-sample evaluation by a trained panel of judges.

For flavor evaluation, a 4.0 g. sample of the soy protein concentrate was dispersed in 200 ml. of boilding distilled water in a 600 ml. beaker. When the temperature of the dispersion reached 170°–175° F., the judges evaluated in descriptive terms the vapor over the dispersion for odor quality. After the temperature of the dispersion had reached 140°–145° F., the judges tasted it and described the taste in descriptive terms. An evaluation for residual odor was made after the dispersion had cooled to room temperature or about 72°–75° F. Through earlier training sessions, the range of descriptive terms for odor and taste had been standardized within the panel. The flavor quality of the sample in question was then rated according to the terms used by the judges in describing its odor and taste.

Soy protein concentrate produced according to this example was rated as beany and bitter, with slight sour notes. Although such a product is acceptable for certain food uses, particularly those which are strongly flavored, seasoned, or spiced, it was found unacceptable for use in bland food systems such as dairy-type foods.

EXAMPLE 2

In this example, the spent aqueous ethanol of the nature given in Example 1 was rectified under the operating conditions given in that example, with the exception that the rectification column was modified to permit removal of a side stream from the 20th tray. This was by installation of a separation tank with about 75 gallons working capacity and the necessary piping, valves, and pumps as detailed in the foregoing description of this invention. A small side stream of fluid of about 0.5 gallon/minute was continuously diverted to the tank. Water was added at a rate of 0.33 gallon/minute. Under such conditions, after cooling to about 120° F., the fluid in the tank separated into two phases. The heavy phase (ethanol-water rich) was recycled to the column feed tank. The light phase (malodorous contaminant) was eventually discarded. This light phase was dark red-brown and had a persistent disagreeable odor. The rate of removal of light phase amounted to about one gallon/week.

As in Example 1, the ethanol recovered in this process was used to leach defatted soybean flakes. The soy protein concentrate produced thereby was rated by the trained panel as being improved in flavor as compared to the product of Example 1.

EXAMPLE 3

The findings described in Example 2 promoted examination of the nature and composition of fluids on the other trays of the column in the mid-section above the feed point. This revealed that the 20th tray was not the optimum point in this column and feed arrangement for removing the bulk of the so-called malodorous light phase. After investigation, the siphon tube or take-off tube was moved to the 18th tray. The column was then operated under the conditions recited in Example 1 for the rectification of spent aqueous ethanol. Under these conditions, the volume of the undesirable light phase liquid was significantly increased. In contrast to Example 2, the volume removed during continuous operation amounted to about 15 gallons/week.

Soy protein concentrate made with the ethanol rectified in this fashion was found to be significantly improved in flavor by the trained judging panel. The product was described as relatively bland with slight cooked cereal flavor notes.

EXAMPLE 4

For this example illustrative of the invention, less than optimal rectification conditions were chosen so as to accentuate the movement of the malodorous volatile light phase liquid up the column. The specific conditions for rectification of spent ethanol were as follows:

Column feed rate: 12 gallons/minute
Column feed composition: 52% ethanol
Column reflux rate: 10 gallons/minute
Column reflux composition: 81% ethanol
Column temperatures:
  Top tray — 176° F.
  28th tray — 205° F.
  20th tray — 205° F.
  14th tray — 205°F.
Steam flow: 7,500 lbs./hour With the higher top tray and mid-column temperatures due to the column being "driven" hard, it was reasoned that the recovered ethanol would contain the malodorous volatile substances which comprise the so-called light phase. The ethanol recovered in this operation was used to produce soy protein concentrate by the continuous countercurrent extraction of defatted soybean flakes. Representative samples of the so-produced soy protein concentrate were submitted in blind fashion to a trained panel of judges for flavor evaluation. The evaluation was carried out as described in Example 1. The descriptive terms used by the panel to describe the taste and odor of the product included beany, bitter, sour, spoiled fruit and strongly pungent. Such a product is totally unacceptable for food use.

EXAMPLE 5

The spent ethanol rectification "hard driven" operation described in Example 4 was repeated with the exception that a side-stream of fluid was removed from the 18th tray as described in Example 2. The recovered ethanol was utilized to produce soy protein concentrate by the extraction of defatted soybean flakes. Representative samples of this product were submitted to trained flavor judges as described in Example 1. In comparison to the product produced according to Example 4, the product of the present example possessed notably improved flavor characteristics. This again demonstrates the significant value of side-stream fluid removal in the rectification of spent ethanol arising from the extraction or leaching of defatted soybean flakes.

For soy protein concentrate extraction processes of normal size and operation, a 40 tray column is conventional to achieve a satisfactory rectification of 50% ethanol into an ethanol solution approximating 92%. The temperature profile will thus range from slightly below 212° F. at the column bottom to slightly above 172° F. at the column top. Optimally, the feed is introduced at about the twelfth tray — or one located about 30% of the column height above the bottom. Under these conditions, the zone begins at from the 14th to the 16th tray, or from about 5% to about 10% of the column height above the feed inlet. Normally, the zone will extend to the 20th to the 22nd tray, or to a point about 50% to about 55% of the column height above the bottom. Under these conditions it will be appreciated that a narrower definition of the zone will be 40 to 50% of the column height above the bottom, with the midpoint being at the 18th tray. With different feed rates or tray columns with different construction, the location of the zone of contaminants and optimum position of the take-off or siphon tube have been varied somewhat, but this can be located readily by those skilled in the art once the teaching of this invention is known.

Advantageously, the zone for withdrawal is in the temperature range 180°–190° F., but with hard driven columns, the range is somewhat greater, i.e., 180°–205° F.

I claim:

1. In the process of defatted soybean flakes to produce soy protein concentrate having a minimum of 70% protein (N × 6.25) on a moisture-free basis, the steps of contacting defatted soybean flakes with ethanol of a concentration of about to 60 to 80% ethanol to extract the soluble solids from said defatted soybean flakes and stripping aqueous ethanol from said extract,
   introducing the resultant aqueous ethanol solution into a tray-type column for rectification to provide rectified ethanol at the column top and waste water at the column bottom,
   withdrawing at least periodically a portion of said ethanol solution from a point intermediate the column height to remove malodorous contaminants from said ethanol solution, and
   recycling the rectified ethanol into contact with defatted soybean flakes and removing said waste water.

2. The method of claim 1 in which said portion is removed continuously and water added thereto, the water-augmented portion subjected to separation into a contaminant-containing part and a part substantially free of contaminants, the latter part being returned continuously to said column.

3. The method of claim 1 in which said portion is withdrawn from a point in said column having a temperature in the range of about 180°F. to about 205°F.

4. The method of claim 1 in which said portion is withdrawn from a point approximately 40% to about 50% of the height of the column above the bottom thereof.

* * * * *